Feb. 13, 1973  B. D. OLESEN  3,716,711

WATER LEVEL GAUGE USING NEUTRON SOURCE

Filed June 18, 1971

INVENTOR.
BERNHARDT D. OLESEN
BY
THOMAS GLENN KEOUGH
ERVIN F. JOHNSTON
ATTORNEYS

United States Patent Office 3,716,711
Patented Feb. 13, 1973

3,716,711
WATER LEVEL GAUGE USING NEUTRON SOURCE
Bernhardt D. Olesen, San Diego, Calif., assignor to the United States of America as represented by the Secretary of the Navy
Filed June 18, 1971, Ser. No. 154,321
Int. Cl. G01n 21/26
U.S. Cl. 250—43.5                              4 Claims

ABSTRACT OF THE DISCLOSURE

A radioactive source of energy emitting neutrons is placed adjacent a sunken hull and neutrons pass relatively unimpeded through the steel hull and, if included, an internal thermal insulator to a compartment interior. If the compartment is unflooded, most neutrons continue on their way, but if the interior is filled with water, a great many of the neutrons are partially backscattered as they encounter the water medium with a percentage of the backscattered neutrons impinging on a particle detector. The particle detector produces signals representative of the backscatter intensity to an indicator which provides an indication to a diver as to whether or not a compartment is flooded. By relocating the invention along the vertical dimension of the compartment and noting where there is an insignificant level of back-scattering, the level to which the chamber is flooded is determined from the vessel's exterior.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Raising and salvaging of a sunken vessel requires prior knowledge of its weight distribution to allow the proper placement of buoying floats and surface-supported winches. Often, several compartments remain watertight while others are flooded. or partially so, to grossly change the vessel's actual weight distribution. The most widely used method of determining whether or not the compartments of a sunken vessel are flooded calls for a diver's rapping on the outer surface of the hull and listening for echoes. If an echo is present, the compartment is not flooded. However, it is difficult to accurately determine the level to which the chamber is flooded since the "echo transition layer" between air and water in the chamber is difficult to define. A somewhat more acceptable approach relies on placing an ultrasonic energy transmitter on the outer surface of the hull and monitoring the returning echoes. A problem arises when sounding out insulated compartments since the insulation material "looks like" a dead air space to this device and an indication that the compartment is not flooded is given, irrespective of the fact, that inside of the insulation layer, the entire compartment is filled with water.

SUMMARY OF THE INVENTION

The invention is directed to providing a hand held device for indicating the level of a fluid in a sunken vessel and includes a source of radioactive energy held against the vessel's outer surface. Neutrons, emitted from the energy source, pass freely through the steel wall and internally carried thermal insulation layer, but, are moderated if they enter a water medium and partially backscattered through the foam and steel. A particle detector, carried near the energy source, receives the backscattered particles and provides representative signals to an indicator. By noting the visual representation provided by the indicator, a diver is able to determine whether or not there is water in the compartment and to exactly what level it has reached.

The prime object of the invention is to provide a device for indicating the level of a fluid in a sealed container.

Another object is to provide a device for indicating the level of flooded water not requiring any hull penetrators.

Yet another object is to provide a water level indicator, operated by a single diver, having the capability to function reliably at considerable depths.

Still another object is to provide a water level indicator providing representative readings through a laminated steel-insulation material hull interface.

These and other objects of the invention will become more readily apparent from the ensuing description when taken with the drawings.

DESCRIPTION OF THE PREFERRED EMBODIMENT

Figure 1:
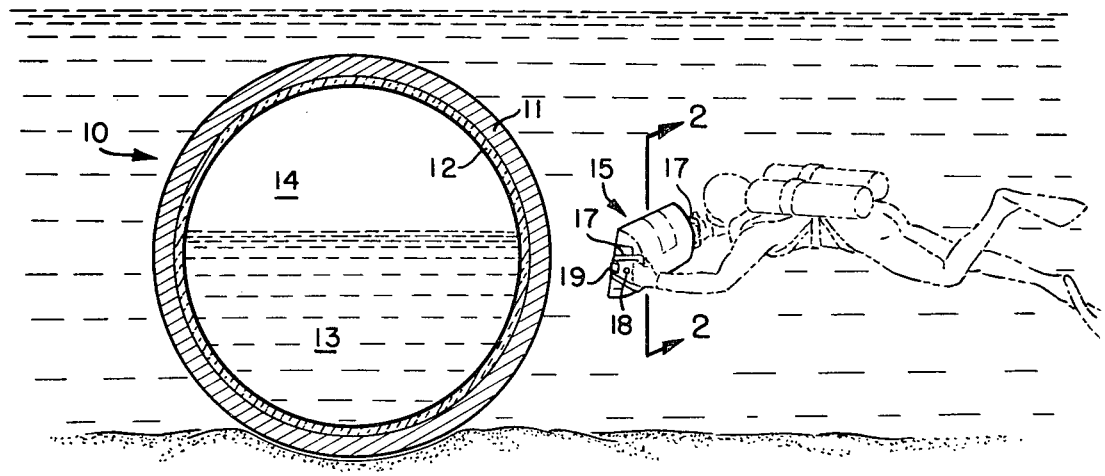
FIG. 1 is an isometric depiction of a diver using the invention.
Figure 2:
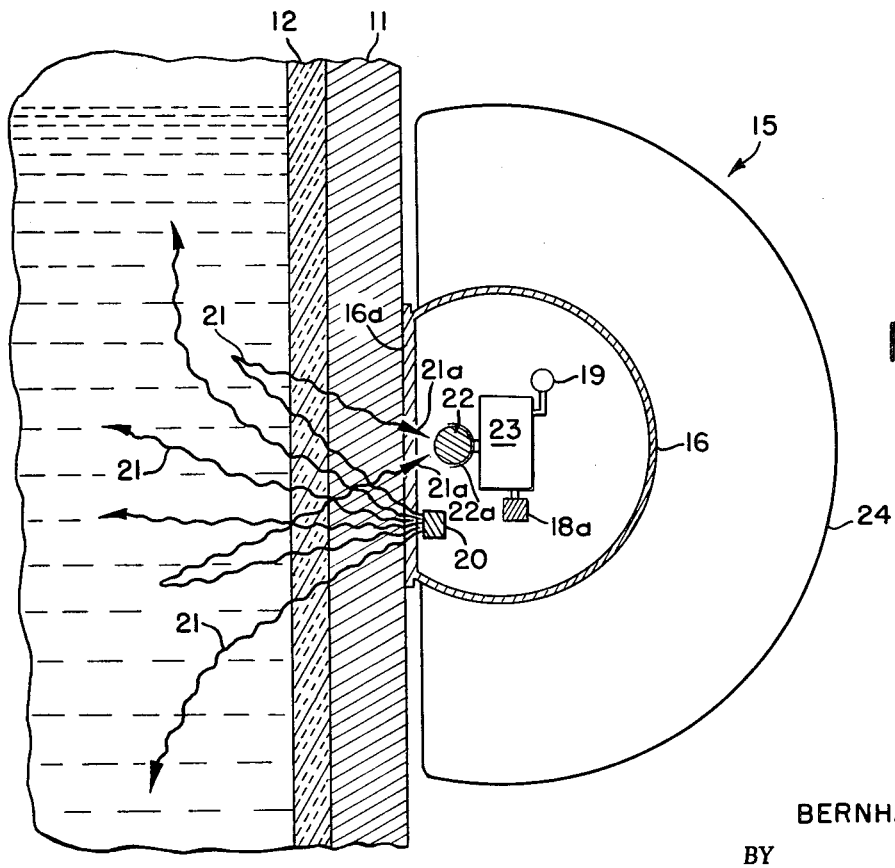
FIG. 2 is a cross sectional schematic representation of the principal components of the invention taken along line 2—2 in FIG. 1.

Salvage and recovery of a sunken surface ship or submarine 10 having a steel hull 11 and, optionally, a thermal-insulator layer 12 involves overcoming a series of technological hurdles. Locating the object is not the least of these and once accomplished, a visual inspection by divers or a remotely controlled TV arrangement, for example, allows a first hand inspection of the external damage and the attitude the sunken vessel assumes on the ocean floor. Although a casual visual inspection identifies areas where the hull is damaged with the consequent flooding of internal compartments, the internal flooding and weight distribution is not obvious. Whether the compartments are flooded with water 13 or contain air 14, or if flooded, to what level, dictates the magnitude of the hoisting force required as well as establishing the placement of the hoisting lines on the sunken vessel. For example, if all the compartments at one end of a vessel were flooded, more hoisting lines should be attached to the heavier flooded end than to the lighter evacuated end to prevent overloading of the hoist lines. If an overloaded hoist line should part, a very real danger is created for salvaging personnel.

The present invention, a water level gauge 15, prevents such hazardous overloading by ensuring a reliable device for determining the degree of compartment flooding to allow safe loading of the hoist lines. A stainless steel cylindrical housing 16 is shaped with a longitudinally running flat wall 16a and sealed at opposite ends to protect the internally carried components. Fashioning it from a 3/16 inch stainless steel shell ensured a rugged construction to render the gauge watertight and operable to a depth exceeding one thousand feet. A pair of handles 17 are provided at opposite longitudinal extremes of the gauge to provide gripping surfaces for a diver for allowing the desired placement of the device. An on-off switch lever 18 mechanically actuates a magnet-reed switch 18a and gives the diver a capability for selectively actuating the internal components after the gauge is properly positioned. An adjacent pressure compensated light 19 is included to provide a visual indication of the degree of flooding in a manner to be elaborated on below. The methods and devices for sealing, such as "O" ring combinations lubricated with silicone grease, are in widespread use in deep ocean instrumentation application and specific examples are dispensed with to expedite a more direct understanding of the invention.

The invention uses as its main active component a source of radioactive material 20 which is of preferably a charge of americium-beryllium omnidirectionally emitting a steady stream of neutrons at a level not dangerous to humans should they be exposed to the material for a moderate period of time. Placing the energy source immediately adjacent flat wall 16a ensures that neutrons are radiated through the hull, schematically shown by arrows 21, although the neutrons are equally radiated in all other directions.

Since generally speaking the direction of travel of emitted neutrons is relatively unimpeded with little or no energy loss and little backscattering as a neutron passes through up to three inches of steel and a similar thickness of an air-entrapping thermal sound insulator, the neutrons continue on their way as if they were passing through an air medium. However, these particles are moderated, that is they lose energy, as they pass through several inches of a water medium and a great many more of them are backscattered in a measurable distribution.

A portion 21a of the backscattered neutrons impinge upon and are detected by a neutron detector 22 which in the prototype embodiment is a combination density-moisture gauge, Model 5901, commercially marketed by Nuclear-Chicago Corporation. By appropriate pressure and voltage adjustments, the detector is sensitive to slow neutrons. High energy or fast neutrons reaching the detector directory from source or not detected or counted. A detector shield 22a optionally is provided to partially prevent unwanted detections of slow neutrons being reflected from a direction other than through wall 16a. Electrically coupled to the neutron detector, a combination scaler and time-average counter 23 having its own biasing source receives signals representative of the density of the backscattered neutrons to provide a signal for actuating the electrically coupled light 19, when a predetermined magnitude is exceeded.

A commercially available scaler time-averager is a Model 5920 also marketed by Nuclear-Chicago Corporation and, when provided with a suitable internal biasing, is capable of operation for prolonged periods of time. On-off switch 18a couples the scaler time-averager circuit to its biasing source permitting the intermittent actuation of the circuit after flat wall 16a is held adjacent to the outer surface of a sunken vessel. Here it should be noted that magnets optionally are carried along wall 16a to aid placement of the device on the hull.

The weight of the housing and internal components along with the handles approached 80 pounds in air and imposed an undue burden in the undersea environment where mobility and repeated placement on the hull is called for. A molded urethane shroud 24 is disposed about housing 16 to provide a suitable amount of buoyancy rendering the gauge only slightly negative. The shroud also tended to reduce the level of backscattering of neutron particles which might otherwise reach the neutron detector from a direction other than through flat wall 16a and minimized erroneous indications of water. In other words, with the outer surface of the housing, other than that defined by flat wall 16a, immersed in the water medium, and backscattering of the omnidirectionally emitted neutrons from source 20 reaching the neutron detector will falsely indicate the presence of water inside the sunken vessel.

In operation, the water level gauge is held against the outer surface of the sunken vessel with a flat wall 16a adjacent a steel hull 11. Although there is, in all probability, a thin layer of water between the flat wall and the hull, any neutron backscattering attributed to this layer is insignificant and not indicated by light 19. Neutrons emitted from source 20 of radioactive energy effortlessly and unimpededly pass through the steel hull and its adjacent thermal and sound absorbing layer 12. Upon reaching the inside of the vessel at a location in a compartment determined by the physical positioning of the gauge, the neutrons are free to travel-on relatively unimpeded with little energy loss if the compartment is filled with air 14. However, if the compartment is filled with water 13, or if the compartment is filled partially and the gauge is below the water level, certain neutrons 21a are deflected and backscattered in far greater numbers to neutron detector 22. Having the scaler time-averager circuit present to indicate the presence or absence of water as determined by the level of saturation of the backscattered neutron particles causes a preset actuation of light 19 and by merely being on or blinking informs the diver of the internal level of water.

Having the aforedescribed components, suitably biased and arranged, the water level inside the pressure hull through a steel and insulation material layer is determined by the invention to have a water level resolution of ±1½ inches when the neutrons penetrate a composite layer of 2.5 inches steel along with a similar thickness of a thermal-sound absorption material having the characteristics and properties of a commercially available material marketed under the trademark "Ensolite." Furthermore, since having a hull thickness of ¼ inch provided a ± resolution of .25 inch, it is immediately apparent that a direct proportional resolution capability is provided being proportioned to the thickness of the hull.

Obviously, many modifications and variations of the present invention are possible in the light of the above teachings, and, it is therefore understood that within the scope of the disclosed inventive concept, the invention may be practiced otherwise than specifically described.

What is claimed is:

1. A portable device hand-held by a diver for indicating the level of a fluid in a submerged container comprising:
    a watertight and pressure resistant housing having one outwardly facing surface configured to conform to the wall of said submerged container;
    means externally mounted on said watertight housing for providing the temporary attachment of the said outwardly facing surface adjacent said wall of said submerged container;
    a source of radioactive energy disposed in said watertight housing carried adjacent the inside of said outwardly facing surface for emitting particles having the capability of making a bidirectional excursion through said wall yet being partially deflected and back-scattered by said fluid;
    a particle detector located in the interior of said watertight housing disposed near the radioactive energy source being oriented to receive a portion of the deflected and backscattered particles to provide representative signals; and
    means carried in said watertight housing connected to said particle detector for providing an external indication of the magnitude of said representative signals, upon exceeding a predetermined magnitude, indicating the presence of said fluid at a particular level in said housing container.

2. A device according to claim 1 in which said particle detector includes a time averaging circuit to provide said signals as a funciton of the time-averaged received deflected and backscattered particles.

3. A device according to claim 2 in which said radioactive energy source is a neutron source and said particles are emitted neutrons having the capability for penetrating over two inches of steel and an inch of insulation material.

4. A device for indicating the level of fluid in a submerged container comprising:
    a neutron source held against the outer surface of a wall of said container emitting neutron particles having the capability of making a bidirectional excursion through said wall yet being partially deflected and backscattered by said fluid;

a neutron detector disposed near the neutron source being oriented to receive a portion of the deflected and backscattered neutrons and including a time-averaging circuit to provide representative signals as a function of a time-averaged received deflected and backscattered neutron particles:

a buoyant shroud enclosing said neutron source and provided with an open area through which said neutron particles are directed toward said wall to ensure a more accurate determination of the fluid level while providing buoyancy for said device; and means connected to said particle detector for providing an indication of the magnitude of said representative signals, upon exceeding a pre-determined magnitude indicating the presence of said fluid at a particular level in said container.

References Cited

UNITED STATES PATENTS

| | | | |
|---|---|---|---|
| 2,323,128 | 6/1943 | Hare | 250—43.5 FL |
| 2,714,167 | 7/1955 | Herzog | 250—83.3 R |
| 2,549,176 | 4/1951 | Crumrine | 250—83.3 R |
| 2,378,219 | 6/1945 | Hare | 250—43.5 FL |
| 3,100,841 | 8/1963 | Reider | 250—43.5 FL |

JAMES W. LAWRENCE, Primary Examiner

H. A. DIXON, Assistant Examiner

U.S. Cl. X.R.

250—83.1, 43.5 FL